(No Model.)

D. PATTEN.
HYPOTENUSE CALCULATOR AND INDICATOR.

No. 293,069. Patented Feb. 5, 1884.

Witnesses:
J. A. Dickson
D. Selleck

Inventor:
Dan'l Patten
By his Atty,

UNITED STATES PATENT OFFICE.

DANIEL PATTEN, OF CALISTOGA, CALIFORNIA.

HYPOTENUSE CALCULATOR AND INDICATOR.

SPECIFICATION forming part of Letters Patent No. 293,069, dated February 5, 1884.

Application filed February 18, 1882. (No model.)

*To all whom it may concern:*

Be it known that I, DANIEL PATTEN, of Calistoga, in the county of Napa and State of California, have made and invented an Improved Hypotenuse Calculator and Indicator; and I do hereby declare that the following is a full, clear, and exact description of the same, reference being had to the accompanying drawings.

My invention relates to a device or instrument for the use of the surveyor, draftsman, and carpenter in measuring lines and angles in plotting and in calculating the length and proportion of the hypotenuse and the base or side of any given triangle, the object being to enable these operations to be performed with accuracy, and without complicated and tedious mathematical calculations or the use of other instruments.

Figure 1:
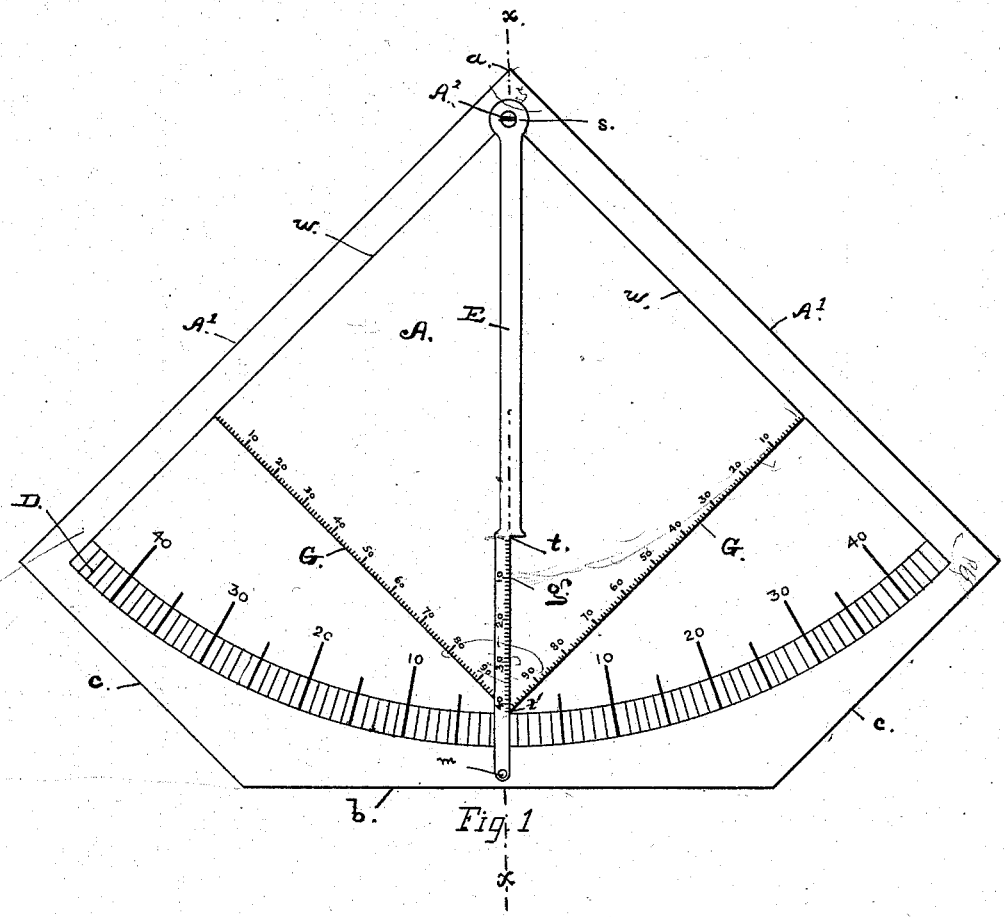
Figure 3:
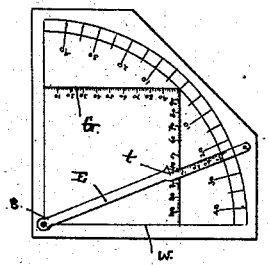
Figure 2:
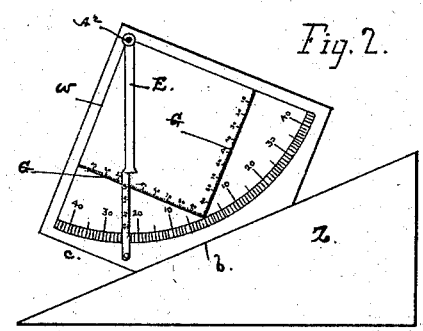

In the said drawings, Figure 1 is a front view of my improved instrument. Figs. 2 and 3 illustrate the manner of applying and operating it to obtain the inclination of a line or surface.

The plate A is formed of sheet metal, of convenient size to be readily handled. It is of quadrant shape, with the curved side replaced by three straight edges, $b\ c\ c$. The edges A' A' meet at an angle of ninety degrees at the point $a$. The perpendicular line $x\ x$, which passes through point $a$, divides the square of which A' A' form two sides in an exactly diagonal direction, and the edges A' A' will be at an angle of forty-five degrees to the said line. From the ends of the sides A' the edges $c\ c$ are carried inward at right angles to meet the side $b$. With a center, as $A^2$, an arc, D, is described upon the face of the plate within the angular edge $b\ c\ c$, and this arc is divided from the center both ways into degrees and fractional parts. At this center a swinging indicator arm or finger, E, is pivoted, so that while resting on the plate it is free to swing over the whole face. The center of suspension, $A^2$, is located upon the diagonal line $x\ x$, which passes through the angle $a$ of the plate and through the zero or middle of the scale of degrees D. The indicating-finger is mounted on its pivot $s$, so that it has free oscillation, and will take a true vertical position at all times when the plate is held upright on edge. Now, these several parts and features produce a simple indicator to obtain the angle or inclination of any line or surface. By applying either of the edges $b\ c\ c$ to any such line or surface and allowing the swinging arm to take the vertical position, which it will do by virtue of the action of gravitation, the edge of the arm will mark on the scale D the number of degrees or angle of the surface from the horizontal or perpendicular. In addition to this, I provide a means of ascertaining and determining the length of any such inclined line or surface without actual measurement of lines and angles, and independent of complicated mathematical calculation. This consists of the scales G G, of equal parts, marked upon the face of the plate A, and a similar scale, $g$, upon the swinging arm E. The graduations G G are upon two straight lines extending from a point, $t$, upon the center line $x\ x$ in opposite directions, making each an angle of forty-five degrees with this line, and terminating at or near the edges of the plate A. They are of equal length, and compose two sides of a square, of which the remaining two sides are formed by the edges of the plate, or by two lines, $w\ w$, drawn parallel thereto. The point of oscillation of the arm is located at the outer corner of this square, and the length of the principal ungraduated portion of the arm, as from $s$ to $t$, is equal to any one side of the square. From this point $t$ the outer end of the arm is graduated into equal parts $g$, corresponding to the graduations of the scales G G. The arm E therefore indicates the exact length of the diagonal of the square $w\ w$ G G. Each line G is divided into one hundred equal parts, and from the point $t$ to a suitable distance down a scale with divisions of the same size is indicated upon the end of the arm. The edge carrying this scale is set in, so that it coincides with a center line passing through the pivot. Now, by the application and relative position of the several scales and the try-edges $b\ c\ c$, it follows that the swinging arm will indicate upon scale D any inclination taken by the plate A, and the degree of inclination of the surface to which one of the edges $b$ or $c$ is applied will be shown by the arm E. The relative length of the hypotenuse of a triangle of such degree is then readily measured by setting the arm E to such degree upon the scale, for when the arm is brought into such position the lines $w$ G will give two sides of such a triangle, and the arm will indicate the hypotenuse. One side of such triangle being divided into equal parts, the proportionate length of the hypotenuse is shown by the scale $g$.

To illustrate by a practical application of the instrument, Z, Fig. 2, may represent an inclined line or surface to be measured, the horizontal being known. One of the edges of the plate is placed against the surface and the arm E allowed to come to the vertical. The degree of inclination or angle of the surface is then read on the arc D. This being given, it is only necessary to place the plate in horizontal position, Fig. 3, and set the arm, by means of a small knob, $m$, on the end, so that it shall mark the given angle on the arc D, as before. This position of the arm will then give the hypotenuse of a triangle of which one side will be indicated by the side $w$ and the remaining side by the line G. The relative lengths of the lines are then shown by the scales G and E $g$. Thus the base or side will be indicated by the line $w$, which, being of same length as G, may, according to the scale here given, be counted one hundred. The perpendicular or other side will be read on scale G, and the hypotenuse will be the length of E from $s$ to $t$ (which here equals 100) + the number indicated on the scale $g$ from the point $t$ to the point where $g$ crosses scale G.

Having thus fully described my invention, what I claim, and desire to secure by Letters Patent, is—

1. The herein-described instrument, consisting of the plate A, with the edges $b\ c\ c$, and scales D and G G, and swinging pendulum E, substantially as set forth.

2. In an instrument of the kind described, the combination, with the swinging pendulum E, having the scale, of the graduated lines or scales G G upon a plate or surface over which the pendulum is adapted to swing, said lines forming the adjacent sides of a square having the pivot of the pendulum situated at the opposite angle, substantially as described, to operate as set forth.

3. The hypotenuse-indicator consisting of the plate or surface A, with its scales D, and having the angular sides or faces $c\ c\ b$, the swinging pendulum E, having the scale $d$, and the scales or graduated lines G G, substantially as described, to operate as set forth.

In witness that I claim the foregoing I have hereunto set my hand and seal.

DANIEL PATTEN. [L. S.]

Witnesses:
 EDWARD E. OSBORN,
 D. SELLECK.